Oct. 7, 1947.  E. H. WITTENBERG  2,428,483
PRESSURE INDICATING AND RELEASE VALVE
Filed Oct. 1, 1943
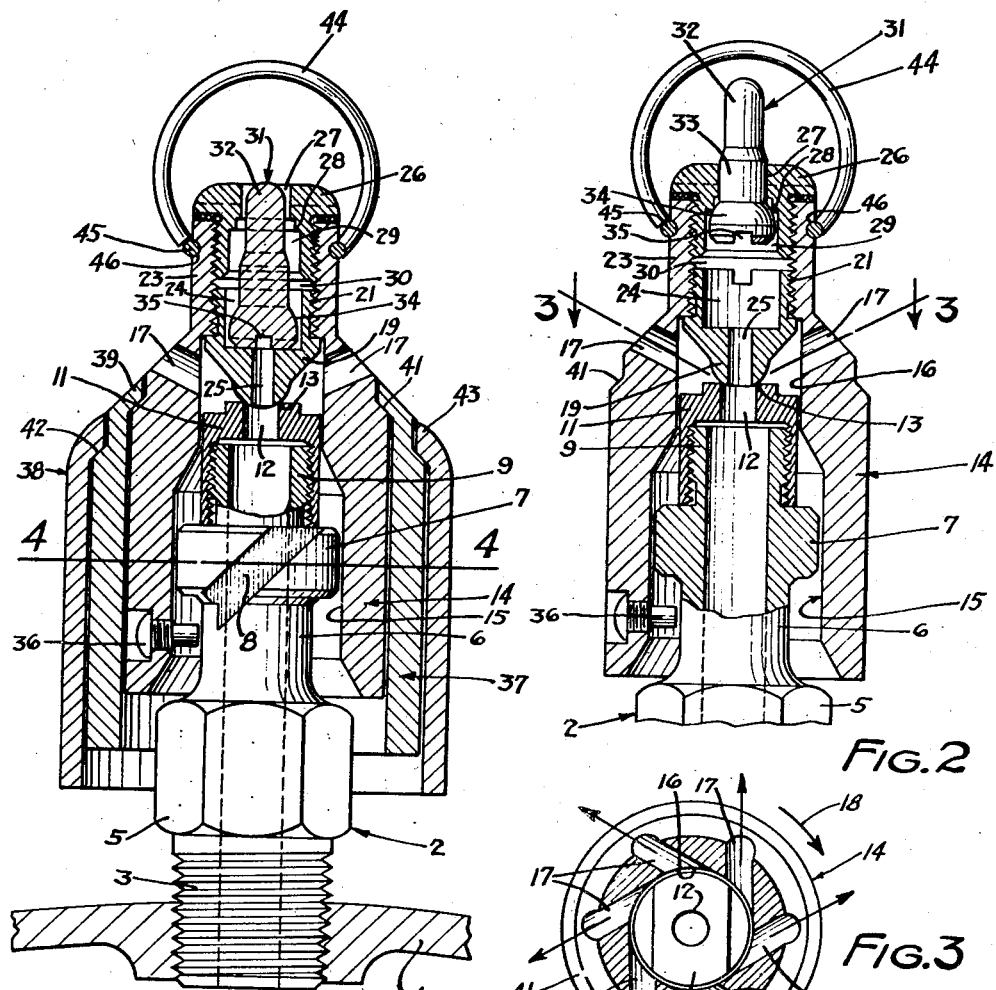
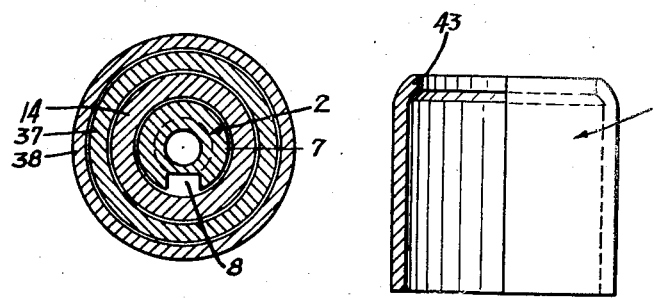
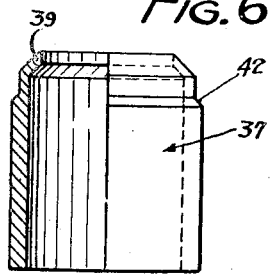
INVENTOR
EDWARD H. WITTENBERG
By Paul, Paul & Moore
ATTORNEYS Patented Oct. 7, 1947

2,428,483

UNITED STATES PATENT OFFICE 2,428,483

PRESSURE INDICATING AND RELEASE VALVE

Edward H. Wittenberg, Eau Claire, Wis., assignor to National Pressure Cooker Company, Eau Claire, Wis., a corporation of Wisconsin Application October 1, 1943, Serial No. 504,588

1 Claim. (Cl. 137—53)

This invention relates to new and useful improvements in pressure indicating and release valves and more particularly to such devices adapted for use in connection with pressure cookers.

In the operation of pressure cookers, particularly of the larger sizes such as are used for canning, it is of utmost importance that the pressure within the pressure cooker be maintained constant during the processing period. Conventional pressure gauges utilizing a Bourdon tube or the like, have been used in the past for indicating the pressure within the cooker, but such devices have not proven entirely satisfactory because when such a device is used the source of heat applied to the cooker must be closely regulated to avoid over-heating so that the pressure within the cooker will not exceed that recommended for the particular product being processed, and also to make sure that the pressure within the chamber does not drop below that recommended. To guard against the above mentioned contingencies it is therefore usually necessary for an attendant to carefully watch the gauge, particularly during the early part of the processing period, or until the product has been thoroughly heated to the particular temperature at which it is to be processed, whereby the source of heat may be varied in accordance with variations in the pressure as indicated on the gauge. After the product within the cooker has been thoroughly heated to the desired temperature, the source of heat may be adjusted to maintain substantially a constant pressure for the balance of the processing period.

It is therefore desirable that a pressure indicating device be provided which will operate automatically to prevent the pressure within the cooker to exceed a predetermined figure, whereby when the pressure has attained the desired figure, no further care need be exercised by the attendant until the processing or cooking period is about to terminate.

An important object of the present invention therefore is to provide a combination pressure indicating and release gauge which may be set or adjusted to a selected maximum pressure, whereby the pressure within the cooker during a given processing or cooking period, cannot exceed that at which the gauge has previously been set.

A further object is to provide a pressure indicating and release gauge which in addition to preventing over-heating during the processing period, includes visible means for indicating to an attendant who may be stationed at a remote point that the processing period is progressing at the selected pressure and whereby the attendant will not be required to frequently regulate the source of heat applied to the cooker during the processing period.

A further object is to provide a device of the class described comprising readily visible means for indicating pressure within the cooker body, and which means will constantly remain in sight so long as there is any pressure within the cooking chamber, and will indicate to the attendant when the cover of the pressure cooker may safely be removed therefrom.

A further and more specific object of the invention is to provide a pressure indicating and release gauge including a tubular stem adapted for mounting in the wall of a pressure cooker such as in the cover thereof, having a valve opening at its upper end surrounded by a valve seat, and a body having a bore therein adapted to engage said seat and to normally close said valve opening, and a plurality of tangential apertures being provided in the wall of said body and establishing communication between the atmosphere and said bore whereby when the valve is unseated by pressure within the cooker body, such pressure will escape through said tangential apertures and thereby cause said body to relatively rotate upon the stem, thereby to visually indicate to the attendant that the desired pressure has been attained within the cooker body.

A further object is to provide a device of the class described comprising a hollow body adapted to be supported upon a tubular stem mounted in the cover of a pressure cooker and which is in communication with the interior of the cooker body, said tubular stem having a valve opening at its upper end provided with a valve seat, and a valve tip being mounted within said hollow body and normally engaging said valve seat to prevent flow through the valve opening, and said hollow body having a chamber in its upper portion whose upper wall is provided with a restricted passage having a valve seat at its lower end, and an indicator pin being mounted in said chamber and normally concealed therein when there is no pressure within the cooker body, said chamber being in direct communication with the valve opening in said stem whereby when pressure begins to develop within the cooker body said indicator pin is projected through the restricted passage in the upper wall of said chamber until the head of said indicator pin engages the seat provided at the bottom of the restricted passage, whereby said passage is closed to prevent further escape of pressure therethrough and after which the indicator pin remains projected from said passage to indicate to an attendant that pressure is present within the cooker body, said pin remaining in such projected position until all of the pressure within the cooker body has been dissipated or released from the cooker body, whereupon the pin recedes to its normal out-of-sight position which is an indication to the attendant that the cover may then be safely removed from the cooker body.

Other objects of the invention reside in the provision of a relatively simple and inexpensive pressure indicating and release gauge having means for visibly indicating pressure within the cooker body; in the provision of means in such a gauge for positively preventing the formation of a vacuum within the pressure cooker body when atmospheric pressure is reached during the cooling-off period, said means permitting atmospheric air to enter the cooker at the termination of the cooling-off period, thereby to prevent the extraction of juices or liquids from sealed jars being processed within the cooker body; in the provision of such a gauge which is readily adaptable for use at different altitudes; in the provision of a pressure indicating gauge and release gauge comprising a plurality of different sized nested sleeves adapted to be seated or telescoped or fitted onto the hollow gauge body, thereby to vary the maximum pressure at which the pressure cooker is to be operated; and in the provision of such a device of simple and inexpensive construction which may be manufactured in quantity production at small cost and which is substantially fool proof in operation.

Other objects of the invention will appear from the following description and the accompanying drawings and will be pointed out in the annexed claim.

In the accompanying drawings there has been disclosed a structure designed to carry out the various objects of the invention, but it is to be understood that the invention is not confined to the exact features shown, as various changes may be made within the scope of the claim which follows.

Figure 1 is a vertical sectional view through my improved gauge showing it mounted upon the tubular stem with the parts in normal position;

Figure 2 is a view similar to Figure 1 showing the removable weights removed from the gauge body, and also showing the pressure indicator pin projected from the upper end of the gauge body as when the cooker body is under pressure;

Figure 3 is a sectional plan view on the line 3—3 of Figure 2 showing the tangential apertures provided in the wall of the gauge body to cause rotation thereof whenever pressure escapes from the cooker body through the tangential apertures provided in the gauge body.

Figure 4 is a sectional plan view on the line 4—4 of Figure 1;

Figure 5 is a side elevational view, partially in section showing the outer or heavier removable sleeve; and Figure 6 is a similar view showing the intermediate sleeve.

The novel gauge herein disclosed is shown comprising a tubular stem generally designated by the numeral 2 having its lower end 3 threaded for threaded engagement with the wall of a pressure chamber such as the cover 4 of the pressure cooker. To facilitate mounting the stem in the cover 4, the stem is shown provided with a hexagonal portion 5 adapted to be engaged by a suitable wrench.

Above the hexagonal portion 5 the stem is reduced as shown at 6 to provide an annular collar 7 having an inclined slot or groove 8 therein, as shown in Figures 1 and 4. Above the collar 7 the stem 2 is provided with a reduced end portion 9 shown threaded to receive a suitable cap 11 having a valve passage 12 therein provided at its upper end with an annular valve seat 13.

To adapt the gauge for operation at various altitudes, it may be necessary to change the size of the valve opening 12 in the cap 11 to compensate for variations in atmospheric pressures at various altitudes. The cap 11 is therefore removably secured to the stem whereby it may be readily interchanged with other caps having different size valve openings therein depending upon the location or altitude where the gauge is to be operated.

The gauge proper comprises a hollow body 14 having a bore 15 therein which is slightly larger in diameter than the diameter of the collar 7 provided on the upper portion of the stem 2. In other words, the bore 15 is such as to loosely fit over the collar 7 whereby the gauge body 14 may freely rotate upon the stem, as will subsequently be described.

The bore 15 above the cap 11 terminates in a reduced bore 16 which has a plurality of apertures 17 in its wall as shown in Figure 2. An important feature of the invention resides in the unique arrangement of the apertures 17 which, as best shown in Figure 3, are disposed in tangential relation to the wall of the bore 16, whereby pressure escaping to the atmosphere through the apertures 17 from the bore 16 will impart rotation to the gauge body 14 as indicated by the arrow 18 in Figure 3.

To prevent escape of pressure from the tubular valve stem into the bore 16 at the upper end of the body 14, during the initial operation of the cooker, a valve tip 19 is shown mounted in the bottom of the bore 16 and normally engages the valve seat 13 as shown in Figures 1 and 2 thereby to cut off communication between the valve opening 12 and bore 16.

The valve tip 19 is shown provided with a threaded portion 21 received in threaded engagement with a bore 22 provided in the upper reduced end portion 23 of the gauge body 14. The valve tip 19 is shown provided with a counter-bore 24 which is in communication with the valve opening 12 through a duct 25.

Also received in threaded engagement with the upper reduced end portion 23 of the gauge body 14 is a terminal cap 26 having a vent opening 27 therein provided at its lower end with a valve seat 28. The terminal cap 26, like the valve tip 19, has a counter-bore 29 therein disposed in opposite relation to the counter-bore 24 in the valve tip 19. The counter-bores 24 and 29 cooperate to provide a chamber 30 which is in constant communication with the interior of the pressure cooker through the duct 25, valve opening 12, and tubular stem 2, as will readily be understood by reference to Figures 1 and 2.

Within the chamber 30 there is mounted an indicator pin, generally designated by the numeral 31. This indicator pin has a reduced terminal tip 32 and a relatively larger intermediate portion 33 and a bottom head 34. The head 34 is adapted to engage the valve seat 28 when the pin 31 is in the position shown in Figure 2, When the pin is thus positioned, it will be noted the intermediate portion 33 of the pin is received in the vent opening 27 of the terminal cap 26 and the head 34 is engaged with the seat 28, whereby the opening 27 is sealed against further escape of pressure from within the cooker body. When the indicator pin 31 is in the position shown in Figure 2, it is clearly visible from remote places thereby to indicate that the cooker is under pressure and to warn the attendant that the cover must not be removed from the cooker so long as the indicator pin is clearly visible above the terminal cap 26.

The indicator pin 31 in addition to providing visual means for indicating pressure within the cooker body, also functions to permit atmospheric air to enter the cooker body at the close of the cooling-off period, thereby to prevent the formation of a vacuum within the cooker body.

To thus permit atmospheric pressure to enter the cooker body at the close of the cooling-off period, the head 34 of the indicator pin is made slightly smaller in diameter than the counter-bores 24 and 29 provided, respectively, in the valve tip 19 and terminal cap 26, whereby air may circulate around said head as it recedes to its normal inoperative position shown in Figure 1.

To permit further entrance of atmospheric air into the cooker body after the indicator pin reaches its normal position shown in Figure 1, a transverse slot or groove 35 is shown provided in the bottom face of the head 34 of the indicator pin. This groove or slot maintains constant communication between the chamber 30 and the duct 25 in the valve tip 19, whereby direct communication is established between the atmosphere and the interior of the cooker body, as will readily be understood by reference to Figure 1.

It is to be noted in Figure 1 that the upper end 32 of the indicator pin is relatively smaller in diameter than the vent opening 27 in the terminal cap 26, whereby air may freely circulate through said passage when the parts are positioned as therein shown.

To prevent the gauge body 14 from being blown off the stem 2, in the event of an abnormal pressure within the cooker body, a pin 36 is secured in the wall of the gauge body 14, as shown in Figure 1. The inner end of the pin projects into the bore 15 and is adapted to be received in the inclined slot or groove 8 provided in the annular collar 7 of the stem. The inclination or angle of the slot 8 is in the direction of pin travel, when the gauge body 14 is rotated upon the stem 2, whereby the pin 36 cannot pass upwardly through the slot to permit the gauge body to become disengaged from the stem 2.

In other words, the angle of the slot or groove 8 is such that when the body 14 rotates in a clockwise direction on the stem 2, as indicated by the arrow 18 in Figure 3, the pin cannot enter the groove 8, as will be readily understood. To remove the gauge body 14 from the stem, it is necessary to rotate it in a counter-clockwise direction upon the stem 2 to guide the pin upwardly through the inclined slot 8.

To change the gauge from one predetermined pressure to another, a series of demountable weight sleeves 37 and 38 are provided as shown in Figures 5 and 6. The intermediate or smaller size sleeve 37 is adapted to telescope over the body 14 of the gauge and is provided at its upper end with an inwardly projecting flange 39 adapted to engage an annular seat 41 provided on the gauge body 14, as clearly illustrated in Figure 1.

A similar annular seat 42 is provided on the smaller weight sleeve 37 adapted to be engaged by an inwardly turned flange 43 provided on the upper end of the relatively larger weight sleeve 38, whereby the sleeve 38 may be telescoped over the smaller sleeve 37 and supported thereon as shown in Figure 1.

From practical experience I have found that pressure cookers are most frequently operated at certain predetermined pressures as, for example, 5, 10 or 15 pounds. The weight of the gauge body 14, as shown in Figure 2, is therefore so proportioned that it will retain 5 pounds pressure within the cooker body. When the intermediate or smaller sleeve 37 is fitted onto the gauge body 14, the gauge will operate the pressure cooker at 10 pounds pressure. And when the relatively larger sleeve 38 is fitted over the smaller sleeve 37 as shown in Figure 1, the gauge will operate the cooker at a pressure of 15 pounds.

Thus it will be noted that to vary the pressure at which the cooker is to be operated, it is only necessary to remove or attach one or both of the sleeves 37 and 38, depending upon the pressure at which the cooker is to be operated.

To facilitate removing the gauge from the stem 2 when hot, a bail 44 is secured to the upper end of the gauge body, as shown in Figures 1 and 2. This bail is preferably formed from a single piece of wire having one end bent to form a horizontal loop 45 adapted to be received in an annular groove 46 provided in the upper reduced end portion of the gauge body. The horizontally disposed loop of the wire bail is so sized that it is received in the groove 46 with sufficient tension to retain the bail in position upon the gauge without danger of accidentally becoming detached therefrom.

In the operation of a pressure cooker equipped with the novel gauge herein disclosed after determining the pressure at which the pressure cooker is to be operated, the gauge body 14 is positioned upon the stem 2 as shown in Figure 2, or with one or both weight sleeves 37 and 38 mounted thereon, as shown in Figure 1, depending upon the pressure at which the cooker is to be operated. Upon initial heating of the interior of the cooker body, atmospheric pressure entrapped within the cooker body will gradually escape through the vent opening 27 at the top of the gauge, as the contents of the cooker body are gradually heated and pressure develops therein. When the pressure within the cooker body overcomes the weight of the indicator pin 31, said pin will be moved upwardly by the pressure until it engages the valve seat 28, whereby further escape of pressure from within the cooker body is interrupted.

As the pressure within the cooker body continues to rise and eventually reaches the predetermined pressure at which the cooker is to be operated, say for example, 5 pounds, the weight of the entire gauge 14 as shown in Figure 2, will be overcome by the pressure within the cooker body whereupon the valve tip 19 is slightly lifted from its seat 13 and thereby permits pressure to escape into the bore 16 from which such pressure will escape to the atmosphere through the tangential apertures 17 in the upper portion of the gauge body. As the pressure escapes through the apertures 17, a rotary motion is imparted to the entire gauge body 14, as the valve body is then substantially "floatingly" supported on the stem whereby it continues to rotate in a clockwise direction as indicated by the arrow 18 so long as pressure escapes between the valve seat 13 and unseated valve tip 19.

When the pressure within the cooker body has attained the desired figure and the gauge commences to rotate upon the stem 2 as above described, the attendant will so regulate the source of heat applied to the cooker body that the pressure developing within the cooker is just enough to substantially counteract the entire weight of the gauge, whereby a portion of the pressure within the cooker will continually escape through the apertures 17 and thereby cause the gauge to continue to rotate upon the stem 6 during the entire processing period. It will thus be understood that so long as steam continues to discharge through the aperture 17, the attendant is assured that the proper pressure is maintained within the cooker throughout the processing period, and no further attention will be required upon the part of the attendant until the processing period is about terminated, whereupon the attendant will cut off the source of heat from the pressure cooker, after which the cooker is usually allowed to gradually cool until the pressure therein has been dissipated, which may readily be noted by the position of the indicator pin 31 on the cap 26.

In other words, during the processing period, the indicator pin is in the elevated position shown in Figure 2, and as the pressure within the cooker body gradually drops and finally is completely dissipated, the indicator pin 31 drops to its normal out-of-sight position shown in Figure 1, which will indicate to the attendant that the cover of the cooker body may then be removed from the cooker without danger.

Simultaneously as the pressure within the cooker body drops or is dissipated the indicator pin 31 will permit atmospheric air to enter the cooker body as hereinbefore described, thereby preventing the formation of a vacuum within the cooker body which, if allowed to develop, may extract juices and liquids from fruit jars being processed within the cooker, as is well known.

When the gauge herein disclosed is used on a pressure cooker, the danger of over-heating or over-cooking the contents of the cooker is entirely eliminated, because any excess pressure within the cooker body will escape to the atmosphere through the holes 17, as hereinbefore stated.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

A pressure-vacuum release and indicating device comprising a hollow stem adapted to be mounted on the cover of a pressure cooker whereby it is in direct communication with the interior thereof, a valve seat at the upper end of said stem, a body having a bore therein receiving the upper end of the stem, a valve tip in the bottom of said bore normally engaging the valve seat, a plurality of apertures in the wall of the bore disposed in tangential relation thereto whereby when steam pressure within the hollow stem counteracts the weight of the body and lifts the valve from its seat, steam will enter the bore and discharge through said apertures and thereby relatively rotate the body on the stem to indicate a predetermined pressure has at least been attained within the hollow stem, said body having a chamber in its upper portion, means in the valve tip for establishing communication between the chamber and the hollow stem; the upper wall of said chamber having a vent opening therein provided with a valve seat at its upper end, an indicator pin normally concealed in said chamber with its upper end received in the vent opening, said pin having a head at its lower end adapted to engage the valve seat in the upper portion of said chamber when pressure develops within the hollow stem, and to project the indicating pin from the vent opening to indicate said development of pressure within the hollow stem, said indicator pin when unseated from its valve seat admitting atmospheric air into the hollow stem thereby to prevent the formation of a vacuum therein.

EDWARD H. WITTENBERG.

REFERENCES CITED

The following references are of record in the file of this patent:

UNITED STATES PATENTS

| Number | Name | Date |
|---|---|---|
| 1,891,119 | Stover | Dec. 13, 1932 |
| 351,070 | Rice | Oct. 19, 1886 |
| 1,687,641 | Aalborg | Oct. 16, 1928 |
| 2,141,022 | Rotter | Dec. 20, 1938 |
| 2,274,663 | Brisbane | Mar. 3, 1942 |
| 1,326,124 | Vischer | Dec. 23, 1919 |
| 2,297,378 | Wittenberg | Sept. 29, 1942 |
| 297,923 | Fulton | Apr. 29, 1884 |
| 2,053,917 | Mowrey | Sept. 8, 1936 |
| 2,200,903 | Stephens | May 14, 1940 |
| 2,333,415 | Du Bois | Nov. 2, 1943 |
| 2,162,096 | Marmorek | June 13, 1939 |

FOREIGN PATENTS

| Number | Country | Date |
|---|---|---|
| 9,553 | Germany | Sept. 4, 1879 |
| 41 | Great Britain | Jan. 3, 1878 |